Figure 1:
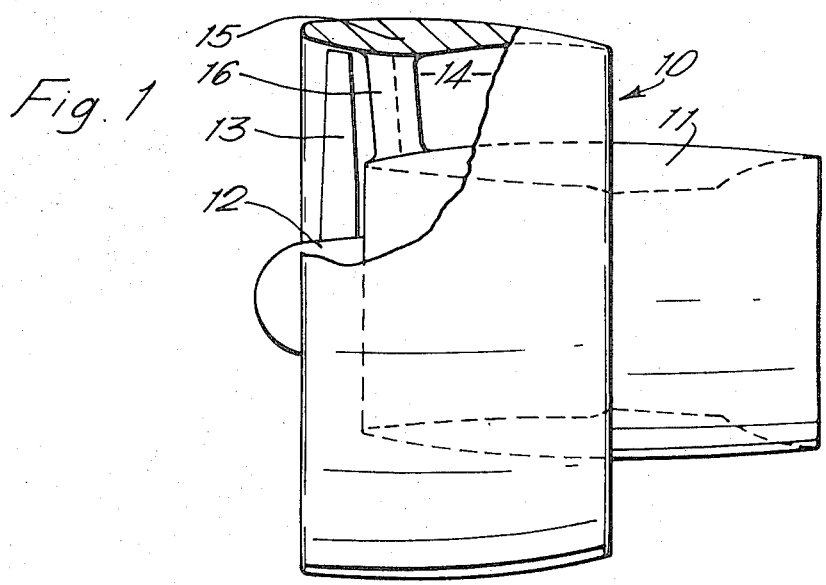

United States Patent

[11] 3,617,147

| [72] | Inventor | Stephen Lawrence Bragg<br>Derby, England |
|---|---|---|
| [21] | Appl. No. | 862,779 |
| [22] | Filed | Oct. 1, 1969 |
| [45] | Patented | Nov. 2, 1971 |
| [73] | Assignee | Rolls-Royce Limited<br>Derby, England |
| [32] | Priority | Oct. 2, 1968 |
| [33] | | Great Britain |
| [31] | | 46740/68 |

[54] FLUID FLOW MACHINE
8 Claims, 2 Drawing Figs.

[52] U.S. Cl. .................................................. 415/77,
 415/219, 415/209
[51] Int. Cl. .................................................. F01d 1/04
[50] Field of Search .......................................... 415/71–74,
 77, 191, 193, 195, 219; 60/226

[56] References Cited
UNITED STATES PATENTS

| 2,069,640 | 2/1937 | Beardsley, Jr. ............... | 415/195 |
| 3,332,241 | 7/1967 | Coplin .......................... | 60/226 |
| 3,472,321 | 10/1969 | Ellinger ....................... | 60/226 |

*Primary Examiner*—C. J. Husar
*Attorney*—Cushman, Darby & Cushman

ABSTRACT: The invention concerns a fluid flow machine provided with an annular duct having at least one aerofoil-shaped strut which extends across the duct, the said strut being axially staggered with respect to and, having on angularly opposite sides thereof axially staggered angularly spaced-apart stator vanes which, reduce the static pressure field set up by the strut.

PATENTED NOV 2 1971 3,617,147

Inventor
Stephen Lawrence Bragg
By Cushman, Darby & Cushman
Attorneys

FLUID FLOW MACHINE

This invention concerns a fluid flow machine such, for example, as a gas turbine engine.

It is frequently necessary to provide a fluid flow machine with one or more struts which extend across an annular duct of the machine. Such a strut, however, may produce a static pressure field which can, for example, cause substantial stresses to be imparted to any rotor blades mounted in the duct.

According to the present invention, there is provided a fluid flow machine with an annular duct having at least one aerofoil-shaped strut which extends across the duct, the or each said strut being axially staggered with respect to and, having an angularly opposite sides thereof, axially staggered angularly spaced-apart stator vanes which reduce the static pressure field set up by the or each strut.

Preferably, the or each strut and the stator vanes disposed on the angularly opposite sides thereof are helically arranged. Preferably also the stator vanes together with the strut or struts, form one complete helical turn. The strut, or at least one of the struts may be disposed between the most upstream and the most downstream guide vane of the helical turn.

Preferably, the last-mentioned strut has leading and trailing edges which are respectively disposed upstream and downstream of the leading edges of the said most upstream and downstream guide vanes.

The suction surface of the or each strut is preferably substantially planar and substantially parallel to the direction of flow.

The annular duct may be a fan duct of a gas turbine engine, said guide vanes being outlet guide vanes of a fan mounted in said duct, and the or each said strut extending between the engine and fan casings. Thus the fan may be a front fan.

Figure 2:
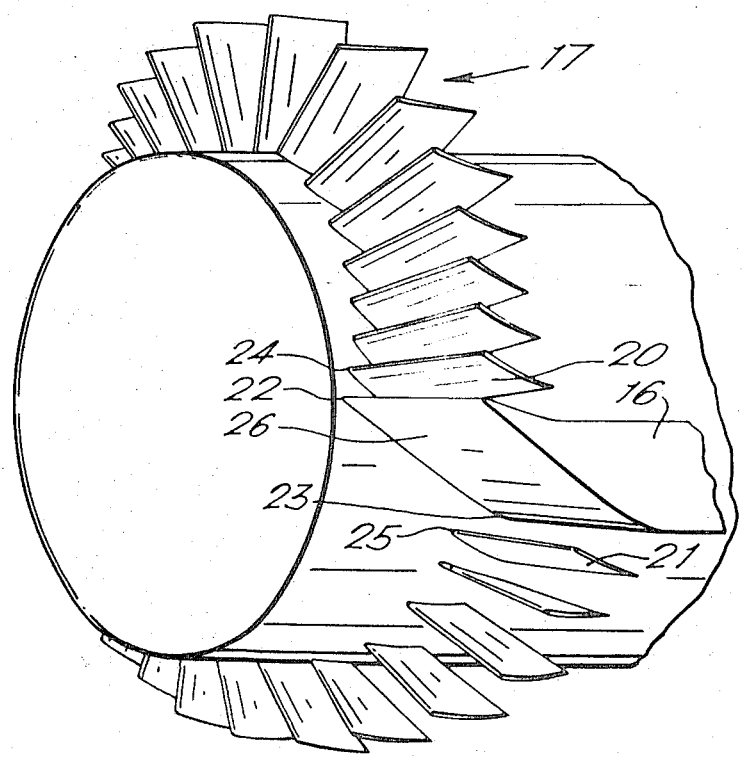

The invention is illustrated, merely by way of example, in the accompanying diagrammatic drawings, in which:

FIG. 1 shows a gas turbine front fan engine in accordance with the present invention, and FIG. 2 is a broken-away view on a larger scale of part of the engine of FIG. 1.

In FIG. 1 there is shown a front fan gas turbine engine 10 having an engine casing 11 within which are mounted a compressor, combustion equipment, and a turbine (not shown) of the engine.

The said compressor and turbine are mounted drivingly on a rotor shaft 12 which is provided at its forward end with front fan rotor blades 13. The fan rotor blades 13 are disposed at the upstream end of an annular duct 14 which is defined between the engine casing 11 and a fan casing 15 which is arranged concentrically outwardly thereof.

The engine casing 11 is supported from the fan casing 15 by way of an aerofoil-shaped strut (or "pylon") 16 which extends across the duct 14 and thus between the engine and fan casings 11, 15.

A helical row of angularly spaced apart, axially staggered aerofoil-shaped outlet guide vanes 17 is arranged in the duct 14 immediately downstream of the fan rotor blades 13. The strut 16 is arranged between the most upstream guide vane 20 and the most downstream guide vane 21 of the said helical row so as to form one complete helical turn therewith, the strut 16 having leading and trailing edges 22, 23 which are respectively disposed upstream and downstream of the leading edges 24, 25 of the guide vanes 20, 21. The strut 16 has, moreover, a suction surface 26 which is substantially planar and is substantially parallel to the direction of flow thereover. Thus, as will be appreciated, the strut 16 is axially staggered with respect to the guide vanes 20, 21 which are disposed on angularly opposite sides thereof.

By reason of the arrangement of the strut 16 in the said helical row, an undesirable static pressure field is not, at least to any extent, set up by the strut 16, and therefore undesirable stresses are not imparted thereby to the rotor blades 13.

I claim:

1. A fluid machine provided with an annular duct having at least one aerofoil-shaped strut which extends across the duct, and a plurality of similarly shaped angularly spaced-apart stator vanes, the leading and trailing edges of the stator vanes on angularly opposite sides of the strut being axially staggered with respect to one another and with respect to the leading and trailing edges of the strut and the leading and trailing edges of the stator vanes being axially staggered with respect to each other to reduce the static pressure field set up by the strut.

2. A fluid flow machine as claimed in claim 1 in which the strut and the stator vanes disposed on the angularly opposite sides thereof are helically arranged.

3. A fluid flow machine as claimed in claim 2 in which the stator vanes together with the strut form one complete helical turn.

4. A fluid flow machine as claimed in claim 3 in which the strut is disposed between the most upstream and the most downstream guide vanes of the said helical turn.

5. A fluid flow machine as claimed in claim 4 in which the last-mentioned strut has leading and trailing edges which are respectively disposed upstream and downstream of the leading edges of the said most upstream and downstream guide vanes.

6. A fluid flow machine as claimed in claim 1 in which the suction surface of the strut is substantially planar and substantially parallel to the direction of flow.

7. A fluid flow machine as claimed in claim 1 in which the annular duct is a fan duct of a gas turbine engine, the said guide vanes being outlet guide vanes of a fan mounted in said duct, and the said strut extending between the engine and fan casings.

8. A fluid flow machine as claimed in claim 7 in which the fan is a front fan.

* * * * *